Oct. 30, 1945. J. W. FRENCH 2,387,838
BINOCULAR OBSERVATION INSTRUMENT
Filed Jan. 25, 1941 11 Sheets-Sheet 1

Inventor
James W. French
By
Lancaster, Allwine and Rommel
Attorneys Oct. 30, 1945. J. W. FRENCH 2,387,838
BINOCULAR OBSERVATION INSTRUMENT
Filed Jan. 25, 1941 11 Sheets-Sheet 2

Inventor
James W. French
By
Lancaster, Allwine and Rommel
Attorneys

Oct. 30, 1945. J. W. FRENCH 2,387,838
BINOCULAR OBSERVATION INSTRUMENT
Filed Jan. 25, 1941 11 Sheets-Sheet 3

Inventor
James W. French
By Lancaster, Allwine and Rommel
Attorneys

Oct. 30, 1945.  J. W. FRENCH  2,387,838
BINOCULAR OBSERVATION INSTRUMENT
Filed Jan. 25, 1941  11 Sheets-Sheet 4

Inventor
James W. French
By
Lancaster, Allwine and Rommel
Attorneys

Oct. 30, 1945.    J. W. FRENCH    2,387,838
BINOCULAR OBSERVATION INSTRUMENT
Filed Jan. 25, 1941    11 Sheets-Sheet 5

Inventor
James W. French

Oct. 30, 1945.  J. W. FRENCH  2,387,838
BINOCULAR OBSERVATION INSTRUMENT
Filed Jan. 25, 1941   11 Sheets—Sheet 7

Inventor
James W. French

By Lancaster, Allwine and Rommel
Attorneys

Inventor
James W. French

Oct. 30, 1945.     J. W. FRENCH     2,387,838
BINOCULAR OBSERVATION INSTRUMENT
Filed Jan. 25, 1941     11 Sheets-Sheet 10

Inventor
James W. French
By
Lancaster, Allwine Rommel
Attorneys

Oct. 30, 1945.  J. W. FRENCH  2,387,838
BINOCULAR OBSERVATION INSTRUMENT
Filed Jan. 25, 1941   11 Sheets-Sheet 11

Inventor
James W. French
By
Lancaster, Allwine & Rommel
Attorneys

Patented Oct. 30, 1945

2,387,838

UNITED STATES PATENT OFFICE 2,387,838

BINOCULAR OBSERVATION INSTRUMENT

James Weir French, Anniesland, Glasgow W. 3, Scotland, assignor to Barr and Stroud, Limited, Glasgow, Scotland Application January 25, 1941, Serial No. 375,999
In Great Britain October 26, 1939

4 Claims. (Cl. 88—33)

This invention refers to binocular telescope instruments.

In the ordinary telescope instrument, the optical system of each limb of the instrument forms an image of the same distant object field and presents it to the eye of the observer, who, as a result of stereoscopic fusion of the two images so formed, sees a single image of that field. It is desirable that as wide a field of view as possible should be obtained, but with known constructions there is a limit beyond which increase of width of field is not practicable. The object of the present invention is to provide a means of increasing the width of binocular telescope field to extents not realisable in present practice.

According to this invention, a binocular telescope instrument is provided, the optical system of each of whose two limbs is arranged to present to the corresponding eye of the observer an image of a distant object field differing wholly or in part from that presented by the other limb, resulting together in the instrument giving a field of view correspondingly greater than that of either limb singly.

The two limbs of the instrument may be arranged to observe two object fields which are contiguous, or which overlap, or which are separate, and to present their images to the observer in contiguous, or overlapping, or separated relationship, the image field relationship being the same or different from the object field relationship.

Further, the two object fields may be side by side in the horizontal direction, or one above the other in the vertical direction, or they may occupy any positional relationship intermediate between the horizontal and vertical relationships.

In carrying this invention into practice, the instrument is so constructed that when it is applied to the eyes the objective axes of the two optical systems are directed, by inclination from the condition of parallelism, to two wholly or partly differing object fields of view, and the two eyepieces are inclined to the objective axes by an amount determined by the magnifications or minifications of the optical systems and by the relative positions of the apparent fields as viewed by the eyepieces with respect to the positions of the corresponding object fields. Thus, the two limbs comprising the objective axes may converge or diverge either in the horizontal or vertical or some intermediate direction towards the two object fields and through the intermediary of a suitable prism combination or other optical combination the eyepiece axes may be inclined to the objective axes in any desired direction to suit the required disposition of the apparent fields with respect to the object fields.

The instrument may comprise a single objective lens adapted to serve the two objective systems, the objective lens being directed to view obliquely one or both of the two object fields of view, with suitable optical combinations arranged to suit the required inclinations of the eyepieces for the purpose desired.

Provision may be made for interocular adjustment and for the combination of two binocular observation instruments for the purpose of increasing the angular field of view in two directions, as for example, the horizontal and the vertical.

The invention as applied to instruments of the field glass type will now be described by way of example with reference to the accompanying drawings, in which:

Figure 1 represents diagrammatically in plan the left limb and the right limb of an ordinary field glass, Figures 2 and 3 represent, respectively, the field of view in the object space and the corresponding field of view as seen by the observer, i. e. the apparent field, using the instrument shown in Figure 1, Figures 4, 5 and 6 are views corresponding with Figures 1, 2 and 3 illustrating a first example of field glass constructed in accordance with this invention, Figures 50 and 51 are a plan view and a vertical section, respectively, and Figure 52 is a field diagram illustrating one form of prism combination, Figure 58 represents in plan the left member of a binocular prism combination and serves to illustrate the effect of rotating that member for interocular adjustment, and Figure 59 is a corresponding field diagram, Figure 60 is an object field diagram and Figures 61 to 64 are diagrams of the apparent field.

Figures 65 and 66 show a third form of interoculer adjustment, and Figures 67 to 70 are explanatory field diagrams.

In all the examples, 1 denotes the objective with centre 2, while 3 denotes the eye of the observer with exit pupil 4, and 5 denotes the eyepiece.

Referring firstly to the instrument of known type, in Figures 1, 2 and 3, AB denotes an object in space covering, say, the maximum field capable of being viewed by the particular optical system. The maximum angular field of view is, therefore, A2B. The objective 1 forms an inverted image BA in the focal plane of the binocular. By any known lens or prism means, such as a prism combination of the Porro type, the image BA is rectified to form the image AB, which is observed by the eye 3 of the observer through the intermediary of the eyepiece 5 between the exit pupil 4 and the focal plane AB, whereby the image AB is magnified to the size A'B'. The angle A'4B' represents the apparent angular field and the ratio of the apparent angular field to the actual angular field is the magnification of the system, which corresponds also with the ratio of A'B' to AB. The right hand limb is similar to the left.

Since the two telescope limbs are directed to the same object represented by AB, Figure 2, the two eyes see one magnified image A'B', Figure 3.

Referring now to Figures 4, 5 and 6, the actual field observed is as represented in Figure 5, comprising, instead of one circle AB, as in Figure 2, two circles AB and CD each of the maximum size capable of being viewed by the particular optical system, an imaginary line from A to D in Fig. 4 being parallel to the base line constituted by the observer's eyes.

Figure 6 represents the apparent maximum field of view A'B'C'D' in which AB and CD of Figure 5 are increased in size in accordance with the magnification of the optical system. The observer can view not only objects within the area of the circle AB but also objects within the area of the circle CD. The width and total area of the field observed are accordingly doubled.

Figure 7:
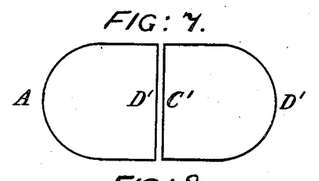
Figures 7, 8, 9, 10, 11 and 12 represent various forms which the two apparent fields may take with an instrument in accordance with the invention.
Figure 8:
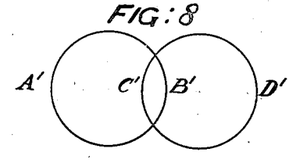

Other shapes and arrangements of field beyond that shown in Figures 5 and 6 can be employed. To do so it is only necessary to provide field diaphragms of the appropriate shape and optical elements that will suit the section of the beam of rays at any part. The two fields may, for example, be D-shaped, Figure 7, and contiguous along the lines B' and C'. Whatever the form, they may overlap as in Figure 8 or be separated as in Figures 9 and 10.

Figure 9:
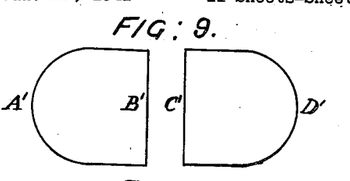
Figure 10:
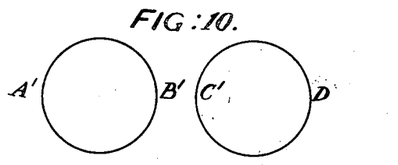

An arrangement of the kind shown in Figures 9 and 10 with separated fields may be of use in a binocular instrument for the observation of the fall of shot from a gun, when the distance between the target, say a ship, and the splash of the shot in the sea, is greater than can be observed by a single image binocular.

Figure 11:
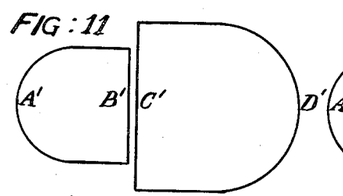
Figure 12:
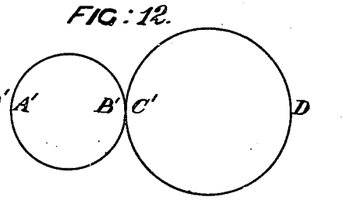

The two fields of view need not be of the same magnification. The left hand fields, as in Figures 11 and 12, may be of low power and the right hand fields of high power.

The apparent field represented in Figure 6 is shown as a magnified reproduction of the object field of Figure 5, in which the circles are in contact at B'C'. The fields AB and CD being the maximum sizes that can be observed by the optical systems, the left and right limbs, Figure 4, cannot observe any objects beyond AB and CD, respectively. The axial directions of the objective systems are such that B and C are contiguous as represented in Figure 5. Hence, the lines B2 and C2, Figure 4, are parallel to one another and correspond in direction with the central axial direction in the case of Figure 1 representing an ordinary binocular. The objectives 1 form at the focal plane a reversed image BA of AB and a reversed image DC of CD, the images being towards the right of the line B2B and towards the left of C2C. By optical means the inverted images BA and DC are reversed and oriented into the positions AB and CD in the focal planes. By means of the eyepieces 5 the eyes 3 observe the focal images AB and CD, which appear magnified as represented by the dotted line A'B' and C'D'.

If the points B' and C' of the image fields are to be contiguous, see Figure 6, the directions 4B' and 4C' are made parallel. The axis of each eyepiece is accordingly inclined to the axis of the associated objective portion. Provided the apparent field is a replica of the object space under observation, the inclination in question is determined by the magnification—the greater the magnification the greater the obliquity of the eyepieces—and by the relative positions required for the two apparent fields.

It is not essential that the apparent field, Figure 6, should be a magnified replica of the object field, Figure 5. It may be minified, in which case the direction of the eyepiece would be determined in the manner described according to the degree of minification and the desired relative positions of the apparent fields.

Whereas the combined object field may comprise two fields separated, as in Figure 10, by an intermediate blank space, the corresponding fields as observed by the eyepiece may appear contiguous as in Figure 6. In such a case the lines B2B and C2C, Figure 4, would not be parallel but would diverge by an amount determined by the separation of the observed fields. The directions 4B' and 4C', Figure 4, would, however, remain parallel as the points B' and C' are to be contiguous. Any desired effect may be obtained, therefore, by a suitable modification of the objective and the eyepiece axes.

Figures 13, 14, 15, 16, 17:
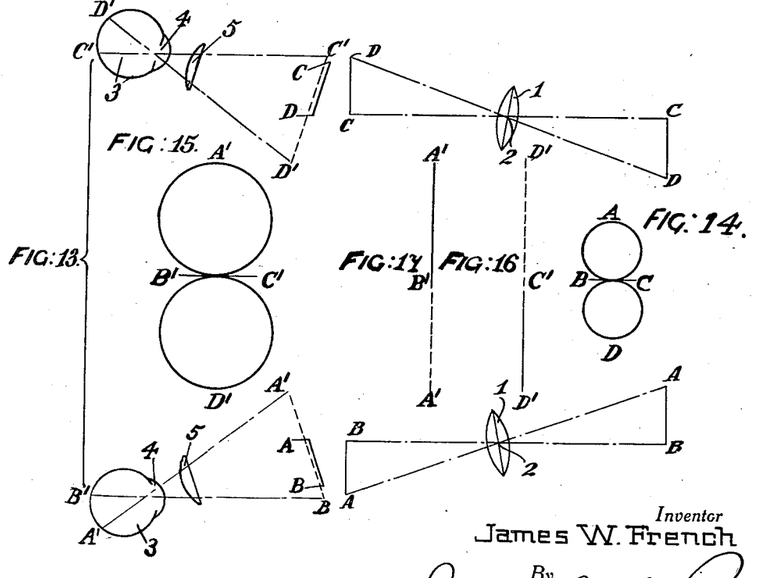
Figure 13 is a plan view of a second example of field glass in accordance with the invention and Figures 14, 15, 16 and 17 are corresponding field diagrams.

In Figure 4 the left hand member is directed towards the left field AB and the right hand member towards the right field CD. In the arrangement indicated in Figure 13 the two objective lines of sight cross. The left hand member is now directed towards the right hand field CD and the right hand member towards the left field AB. The eyepieces in this arrangement are directed outwards as compared with the inwards eyepiece directions of Figure 4. In the brain the fields AB and CD appear in their correct order, and constitute a magnified apparent image of the observed field. The ray C'4 falls upon the fovea centralis of the left eye 3. The ray D'4 falls upon the temporal side of the fovea. The left hand retinal image is shown dotted in Figure 16, where C' is on the fovea and D' on the temporal side. The brain reverses the retinal image and brings it into the full line position C'D'. In the case of the right hand member the ray B'4 falls upon the fovea centralis of the right eye. The ray A'4 falls upon the temporal side. A' and D' being both on the temporal sides are not corresponding points and are seen separately by the brain. The right retinal image, Figure 17, is shown dotted at B'A'. It is reversed by the brain into the full line position B'A'. The sequence therefore of the images A'B' and C'D', Figure 15, corresponds with that of the objects, Figure 14, and the objects appear as two enlarged circles contiguous at B' and C'.

Figures 18, 19, 20, 21, 22:
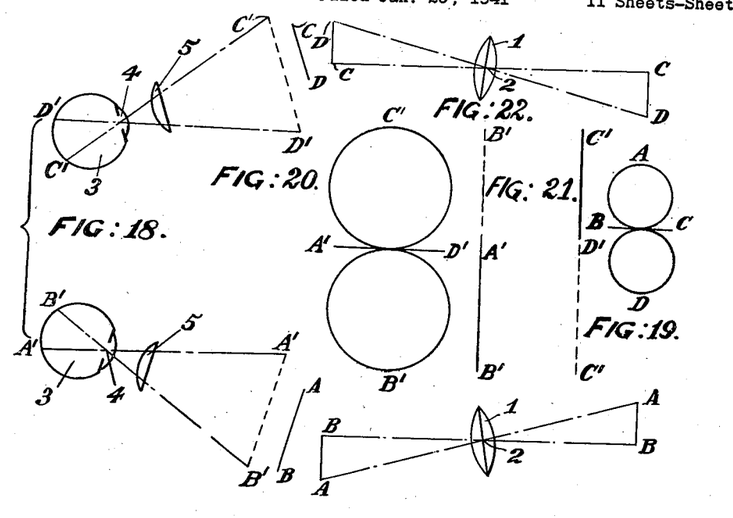
Figures 18 to 22 are corresponding views for a third example.

In the arrangement shown in Figures 18 to 22, the positions of the fields A'B' and C'D' are interchanged in the horizontal direction, see Figure 20, as compared with the object field arrangement, Figure 19. This result is obtained by directing the left objective axis towards the object CD and the right towards the object AB as in Figure 13, with, however, an inward inclination of the eyepiece instead of an outward inclination. As before, the retinal images are shown dotted and the brain images are in full lines, Figures 21 and 22.

Figures 23, 24, 25, 26, 27:
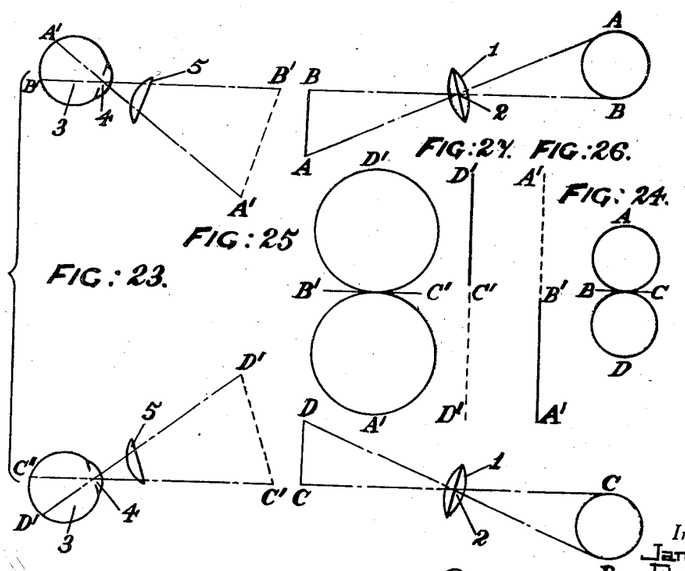
Figures 23 to 27 are corresponding views for a fourth example.

A reversal not only of the two retinal fields of view in position but also of the images contained in them may be obtained by the arrangement represented in Figures 23 to 27, where the left objective is directed towards the left field AB and the right objective towards the right field CD, as in Figure 4. The eyepieces instead of being inclined inwards, diverge outwardly, and the prism or lens system is arranged to orient but not to reverse the image in the field of view. The retinal and brain images as before are represented in Figure 26 for the left member and Figure 27 for the right member and the arrangement of the apparent fields is indicated in Figure 25.

Figure 28:
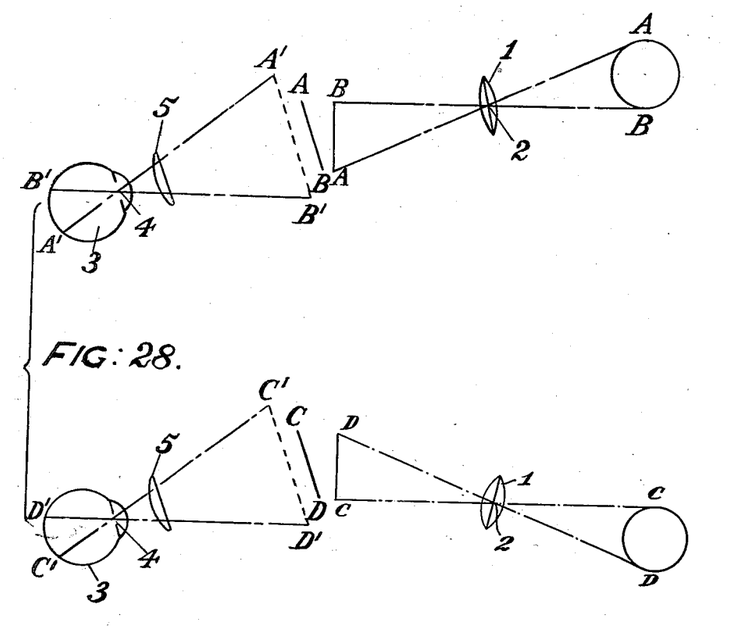
Figures 28 to 32 are corresponding views for a fifth example.
Figure 29:
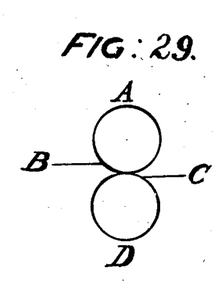
Figures 30, 31, 32:
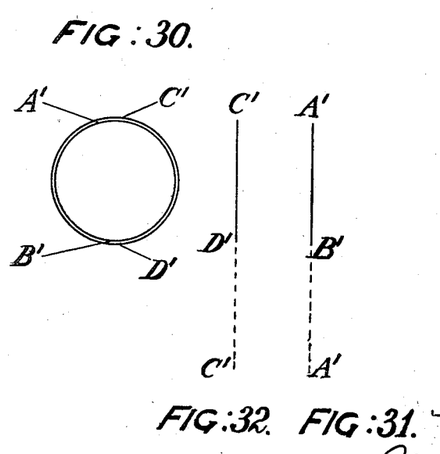

If desired, contiguous object fields AB and CD may be superimposed as in Figure 30. With the arrangement indicated in Figure 28 the contiguous fields are superimposed without reversal of the horizontal directions of either image and if the superimposed images are of suitable form they may be viewed stereoscopically. The left limb of the instrument is directed towards the left field AB and the right limb towards the right field CD. The left eyepiece is directed inwards but the right eyepiece is directed outwards. The directions of the eyepieces are parallel. The retinal and cerebral images are as before represented in Figures 31 and 32.

In the examples so far given the instruments have been of the prismatic type. The invention is equally applicable to other types, as for example, the instrument commonly called the Galilean glass comprising, say, a positive objective and a negative eyelens.

The path of the rays in an ordinary Galilean glass will first be described with reference to Figure 33, in which the image of the object AB is formed on the eye side at BA by the objective 1 whose optical centre is 2. Parallel rays from the point A on the object side are converged by the objective 1 to meet at the point A on the eyepiece side. The cone of the rays thus formed is diverged outwardly by the concave lens 6, and if the eye is accommodated for a focal distance of about 10 inches corresponding with the state of rest of the eye the outcoming rays from the region 7 of the lens 6 will converge to a virtual focal point A' on the objective side of the eyelens and similarly the rays from B of the object will be converged to the virtual focal point B' of the image. The attitude of A'B' is not inverted with respect to AB but is erect and corresponds with it.

Figure 33:
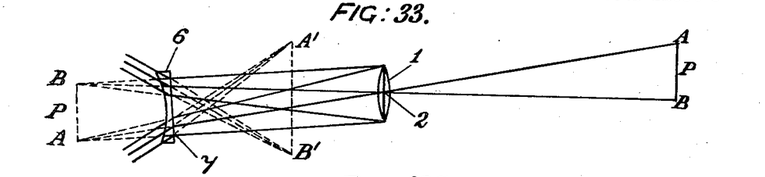
Figures 33 and 33a represent diagrammatically an ordinary Galilean glass.
Figure 33A:
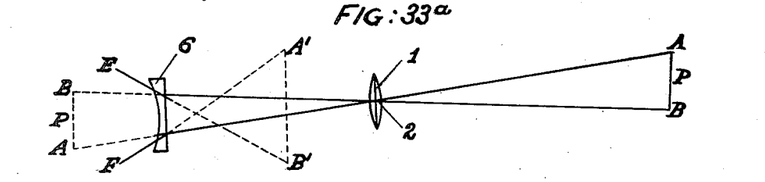
Figures 34, 35, 36, 37, 38:
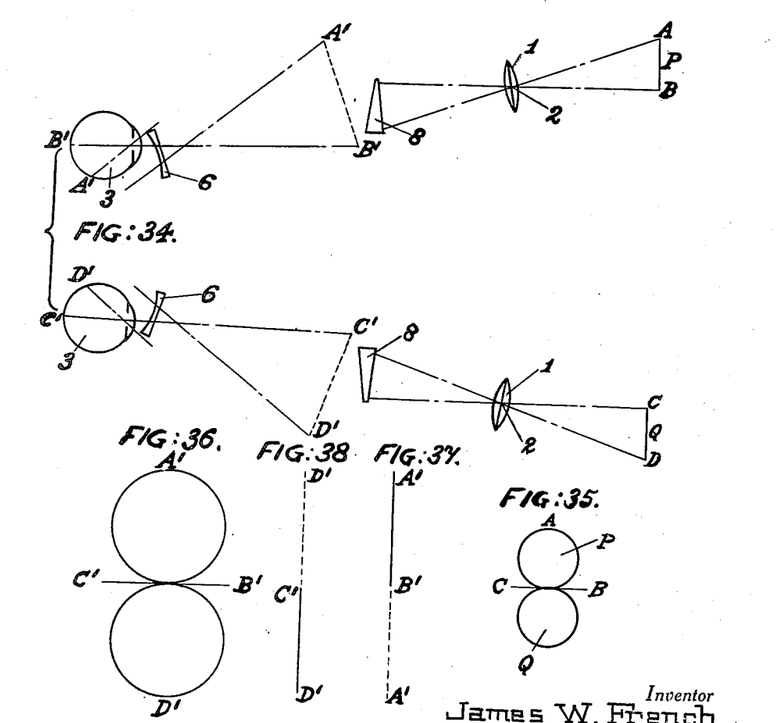
Figure 34 represents diagrammatically in plan a sixth example, viz. a Galilean binocular in accordance with the invention.
Figures 35, 36, 37 and 38 are field diagrams therefor.

Figure 33a is a reproduction of Figure 33 with only the axial rays indicated. If the point B' of the apparent field A'B' is to correspond with point B of the object, it is necessary to displace angularly the optical centre of the concave lens 6 to such an extent that the direction EB' is parallel to B2B. In Figure 34 this deviation is produced by means of refracting prisms 8 whereby the apparent directions of B'B' and C'C' are made parallel to one another with the result that the apparent fields become contiguous at B' and C', Figure 36.

Any of the field arrangements previously described may also be obtained when the optical system is of the Galilean type, by the suitable arrangement of known optical parts.

In all the examples hitherto described it has been assumed that the two limbs of the binocular observing instrument are directed to two fields of view situated side by side along the horizontal direction. It is not necessary that the two fields of view should be so disposed. They may be vertical one above the other or disposed along any desired direction.

Figures 39, 40, 41, 42, 43, 44, 45, 46, 47, 48, 49:
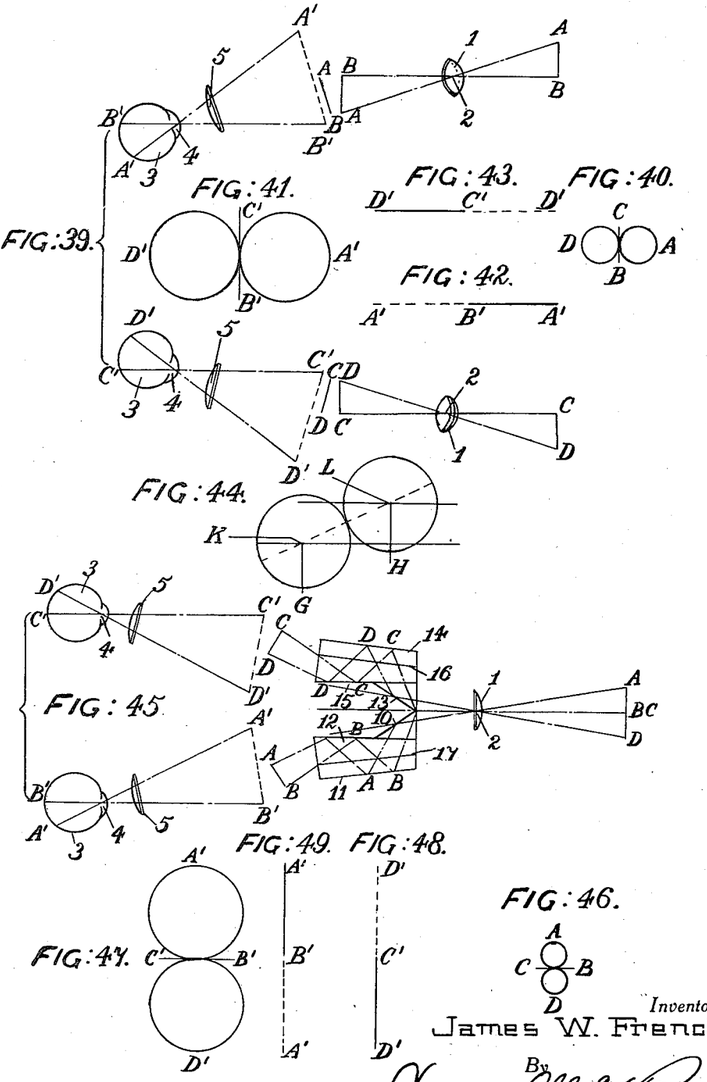
Figures 39 to 43 are a side sectional view of, and field diagrams for, a seventh example.
Figure 44 is a further field diagram.
Figures 45 to 49 are a diagrammatic plan view and field diagrams for an eighth example.

Figure 39 represents a binocular instrument for the observation of two fields, Figure 40, disposed one above the other. The fields are shown contiguous. They may overlap or be separated in the manner already described with respect to a horizontal arrangement.

Whereas in Figure 4 the limbs are shown in plan view looking downwards from above the binocular, in Figure 39 the views of both limbs are sectional elevations in a vertical plane looking, in both cases, from the right hand side of the binocular, that is to say, in actuality the objects AB and CD occupy a vertical position, not a horizontal position as previously described. It is assumed that the left and right hand limbs, Figure 39, are directed towards the upper field AB and the lower field CD, respectively, Figure 40, where the line AD is vertical, and that the apparent fields A'B' and C'D' are to be contiguous as shown in Figure 41 where A'D' is vertical. To obtain this result it is necessary to direct the left eyepiece in a downward direction by the amount necessary to bring B'B' parallel to B2B and similarly the right eyepiece is directed upwards until the line C'C' is parallel to C2C. The two objective directions are also inclined to one another in the horizontal direction. The images in the brain combine to produce the apparent fields of Figure 41 lying in a vertical direction one above the other.

By suitable direction of the objective and eyepiece axes of the two limbs all the effects previously described with reference to fields of view side by side can similarly be obtained with respect to fields of view one above the other.

The fields may be oriented as in Figure 44 along an oblique line. To this end, the two limbs of the binocular have a component divergence in the horizontal direction corresponding with the distance GH and their eyepieces are correspondingly directed in the horizontal plane to produce the desired apparent component of horizontal displacement in the horizontal plane. The two limbs have also a component divergence in the vertical direction corresponding with the distance KL and the eyepieces are correspondingly directed by an amount necessary to bring the apparent fields into the desired vertical relative positions.

So far, it has been assumed there are not only two eyepieces but also two objective lenses, the optical systems of the left and right limbs of the binocular being distinct, but an observing instrument in accordance with the invention may have only one objective as represented in Figure 45, the single objective lens being adapted to observe the left and right fields of view with the eyepieces so directed outwards that the left apparent field, Figure 47, corresponds with the left object field and the right apparent field with the right object field. In all the previous examples, each of the two objectives could be directed towards the centre of its field area. In the arrangement, Figure 45, the objective is set normal to the lines of symmetry B2 and the vision through the objective in the case of the left and right members is oblique. Two symmetrically disposed prism combinations are provided. Rays from the point B pass through the optical centre 2 of the objective 1. They are reflected from the surface 10 of the right hand prism combination to the reflecting surface 11 and thence to the reflecting surface 12 outwardly to the focal position B. Rays from A similarly pass through the optical centre 2 of the objective 1 and are reflected from the surfaces 10, 11 and 12 to the focal plane point A, thus forming the image AB. Similarly in the case of the left hand limb, rays from C and D of the object pass through the optical centre 2 of the objective 1 and are reflected in sequence from the surfaces 13, 14 and 15 to form the focal image CD. The eyes 3 see the apparent images A'B' and C'D'. The retinal and brain images are shown in Figures 48 and 49. The observed apparent field A'B'C'D', Figure 47, is therefore a magnified replica of the object ABCD. The system of prisms indicated not only brings the focal image into the correct attitude in the horizontal plane and into positions that will suit the ocular separation of the eyes but by the addition of the known roof type of reflecting surface, represented by the lines 14—16 and 11—17, the image is rectified also in the vertical direction and there is therefore no vertical inversion of the apparent fields. Other combinations of prisms or lenses may be employed to give the same desired results.

A prism combination of a modified Porro type suitable for, say the left limb of the instrument shown in Figure 4, and so arranged as to rectify in the horizontal and vertical directions the inverted image produced by the objective 1 and viewed by the eyepiece 5 is represented in Figures 50 and 51, the objective 1 being shown somewhat to the right of its proper position in Figure 51 for the sake of clearness. The ray B passing through the optical centre 2 of the objective 1 is reflected at the point 18 from the reflecting surface 19 of the prisms 200. It is then reflected at the point 21 from the reflecting surface 22 of the prism 23. The ray is not affected by transmission through the interface of the two prisms, which may be cemented together. From the point 21 the ray is reflected to the point 24 of a reflecting surface, which directs the ray upwards to the point 25 of an upper reflecting surface of the prism 26 from whence it passes outwards to the focal point B. Similarly the ray from the object point A passes through the optical centre 2 of the objective and reaches the focal point A. The orientation of the prism 26 is such that the image direction B'4B' is parallel to the object direction B2B.

In Figure 52 the two maximum fields under observation are represented as before by the horizontally disposed contiguous circles AB and CD. In the horizontal plane the ray from B falls ultimately upon the fovea centralis of the left eye of the observer. In the vertical direction, however, represented by the line EF, Figure 51, the centre G falls upon the fovea centralis. E and F are symmetrical about the centre line G2. The centre ray G2, after reflection by the prism 20, Figure 50, is reflected by the prism 23 at the point 21 towards the prism 28 from the lower surface 27 of which it is reflected at the point 24 upwards to the point 25 of the upper reflecting surface 26 and thence outwards to the point G. Similarly the points E and F of the object reach the points E and F of the image and appear erect in their correct vertical order. The two reflecting faces 19 and 22 in the horizontal direction rectify the reversed image formed by the objective in the horizontal direction and the two reflecting faces 27 and 28, Figure 51, rectify in the vertical direction the inverted image formed by the objective.

By other combinations of prisms any desired effect may be obtained, for example, the prism combination of Figure 45 embodying two plane reflecting surfaces and a roof reflecting surface may be employed.

Adjustment of the eyepieces of a binocular constructed in accordance with this invention to suit the interocular distance of the observer's eyes may be effected in various ways. In binoculars of known types it is essential that the alignment of the two limbs should be maintained with accuracy, particularly when the magnification is large, and it is essential that any means for the adjustment of interocular distance should not disturb the alignment. In a binocular constructed in accordance with this invention accurate preservation of the alignment is of secondary importance as the binocular is directed towards two separate object fields and not towards a single field which necessitates the stereoscopic fusion of two fields in the brain.

Figure 53:
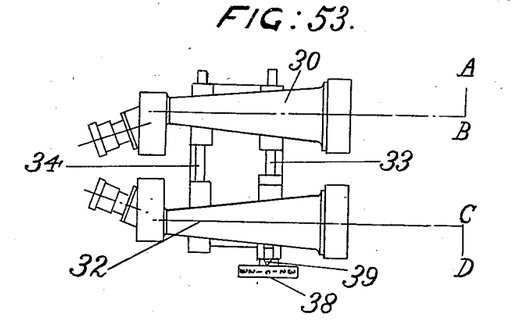
Figures 53 to 55 show an instrument capable of interocular adjustment.
Figure 54:
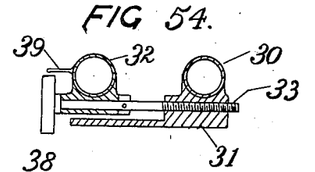
Figure 55:
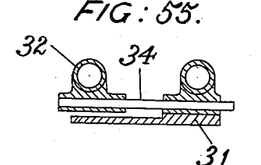

In Figures 53, 54 and 55, a binocular having limbs of the type indicated in Figure 4 and designed for interocular adjustment is represented, Figures 54 and 55 being transverse sections. The left limb 30 is carried rigidly upon a holder 31, which may be held in the hand or fixed in position. The right limb 32 is supported with respect to 30 upon a screw 33 and a parallel guide 34. When the head 38 is rotated the screw 33 moves transversely with respect to 31 and carries with it the limb 32. Upon the head 38 there is shown engraved a dioptric scale with a suitable index 39 attached to the member 32. By these means separation of the eyepieces can be adjusted to suit the observer. As the displacement involves no change in the direction of the objective axes or the eyepiece axes the two contiguous object fields AB and CD will remain contiguous in the apparent field of view.

Figure 56:
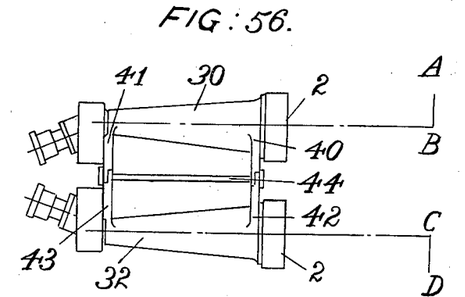
Figures 56 and 57 show a second form of interocular adjustment.
Figure 57:
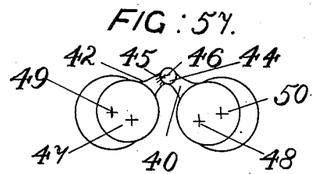

A hinge, such as is commonly used for the interocular adjustment of ordinary binoculars, may be employed as represented in Figures 56 and 57, where 40 and 41 are hinge arms integral with the left limb 30, and 42 and 43 corresponding hinge arms integral with the right limb 32, the hinge pin being represented by 44. Figure 57 represents the binocular as viewed from the objective end. The interocular scale 45 is shown engraved on the hinge arm 42, the indications being read opposite a pointer 46 associated with the arm 40. By hinging the limbs outwards they may be separated from the positions 47 and 48 into the positions 49 and 50. The eyepieces will be displaced by an equal amount. As the objective directions B2 and C2 are parallel to the axis of the hinge, interocular adjustment does not affect the objective direction of the two members but as the axes of the eyepieces are inclined to these directions, a displacement of the apparent fields relative to one another will occur. The amount is, however, of a small negligible order and the preservation of alignment is of secondary importance. The nature of the displacement of the apparent fields will be described with reference to Figures 58 to 64.

In the interocular adjustment about a hinge axis the equivalent angular rotation of the limb about its axis need not be greater than about 15°. It will be assumed, however, that the system shown in Figure 50 is rotated about the line B2B through 180°, into the position represented in Figure 58. It will be seen that the image A'B' still has the same attitude to AB, Figure 59. It is not reversed in any way but whereas in Figure 50 the ocular direction B'4B' is parallel to B2B, in Figure 58 it is the ocular direction A'4A' that is parallel to B2B. If the right member is rotated through 180° in the same way it will be seen that, although no reversal of the apparent image is involved, the direction of the eye is towards D instead of towards B, that is to say, the points A and D of the object appear in the apparent field contiguous instead of the points C and B which are contiguous in the object field. Figure 60 represents the object fields AB and CD contiguous at B and C. Figure 61 represents the corresponding apparent fields resulting from the use of a binocular, one limb of which is represented in Figure 50, the apparent fields being contiguous at B' and C'. If the two limbs of this binocular are rotated through 90° the fields A'B' and C'D' will move towards one another and become superimposed as in Figure 62. If the limbs are rotated still further into the 180° position, opposite movements of the fields A'B' and C'D' will continue until C'D', Figure 63, occupies the position of A'B', Figure 61, and similarly A'B', Figure 63, occupies the position of C'D', Figure 61. If, however, each limb is only partially rotated through the equivalent of an angle of 15° about the objective direction, the points P and Q will coincide with the angles B'RP and C'DQ are each 15°. The amount of this overlap is represented in Figure 64. It can be halved by so directing the eyepieces that at the one extreme position there is a separation of half the original amount between the apparent fields and at the other extreme position an overlap of half the amount, thus rendering the overlap negligible.

Interocular adjustment may be effected by swinging the two members about a vertical axis as represented in Figure 65, where 51 represents the axis associated with hinge arms 52 and 53 integral respectively with the left member 30 and the right member 32. Steadiness about the vertical hinge 51 may be ensured by the provision of an extension 54 from the body 32, in sliding engagement with a suitable extension 55 of the body 30. A suitable dioptric scale 56 may be associated with the extension 54. In this arrangement the two object fields AB and CD, Figure 67, in contiguity would in one position of adjustment appear contiguous but enlarged as in Figure 68. Displacement of the eyepieces inwards about the vertical axis 51, would, however, alter the direction not only of the eyepiece axes but also of the objective axes. The object fields would, therefore, separate as indicated in Figure 69 and the corresponding magnified apparent fields would also be separated by an equal amount as represented in Figure 70.

Figure 71:
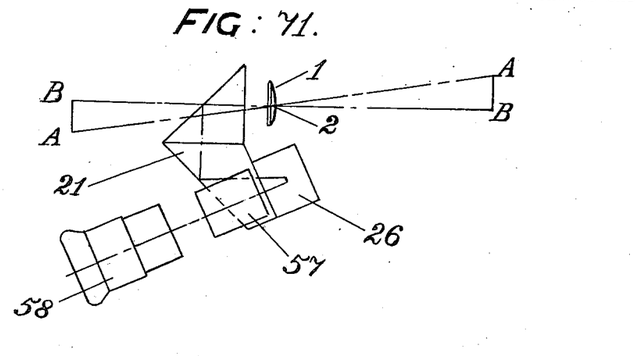
Figures 71, 72 and 73 are three views showing a Porro type combination of prisms with an added step prism for the adjustment of interocular distance.
Figure 72:
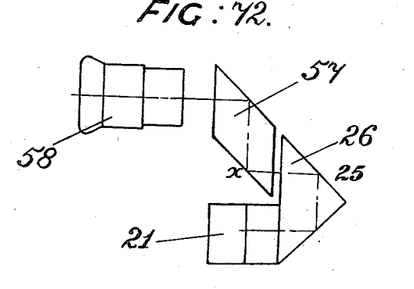
Figure 73:
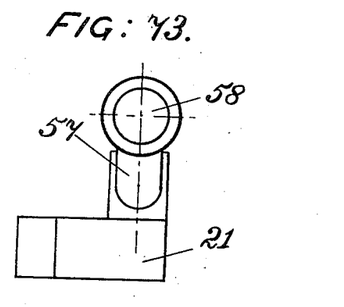

The absence of any change in the relative positions and appearance of the object fields and the apparent fields may be ensured as in the case of the sliding arrangement, Figure 53, by the use of an eyepiece step prism arrangement indicated in Figures 71, 72 and 73.

Figure 71 is a plan view of the prism system represented in Figure 50 to which a step prism 57, which is represented in side elevation in Figure 72, and in front elevation in Figure 73 is added. If this step prism 57 together with its eyepiece 58 is rotated about the axis 25—X of Figure 72 an interocular displacement of the eyepiece 58 will result without any change in the relative positions and attitudes of the two object fields and of the two apparent fields. This arrangement is particularly applicable to a binocular in which the left and right members are integral with one another or, for example, to the binocular represented in Figure 45, in which only one objective is employed.

Any of the interocular adjustment devices described may be applied to the binocular represented in Figure 39, in which the eyepieces are inclined in the vertical plane, or in any of the ways required to produce the effect represented in Figure 44.

Figure 74:
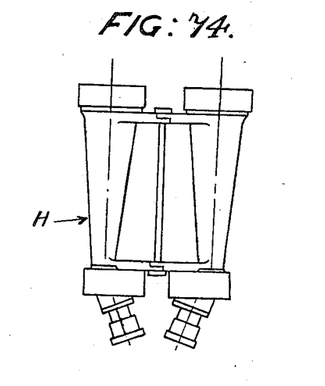
Figures 74 and 75 represent in plan and Figures 76 and 77 in vertical section a combination of two binoculars, the left being adapted for the observation of two fields side by side and the right being adapted for the observation of two fields one above the other.
Figure 75:
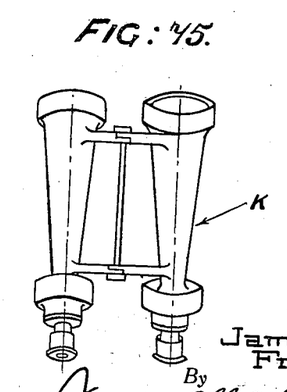
Figure 76:
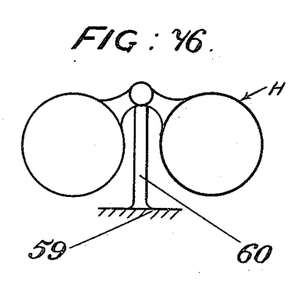
Figure 77:
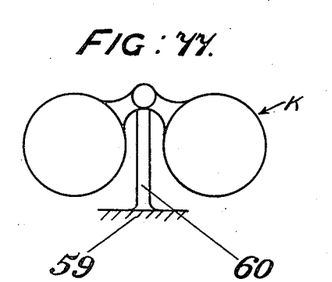
Figure 78:
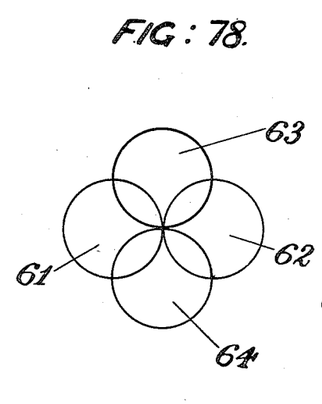
Figures 78, 79 and 80 are three field diagrams corresponding with Figures 74 to 77.
Figure 79:
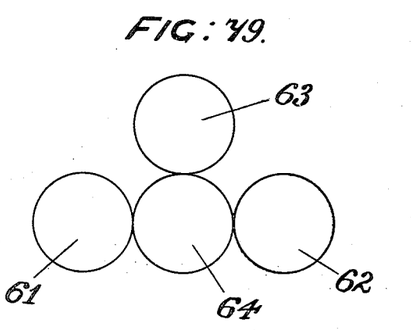
Figure 80:
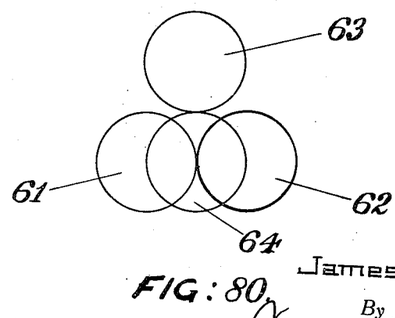

A binocular adapted to observe two fields disposed along the horizontal direction may be combined with a separate binocular used by a second observer adapted to observe two fields disposed along the vertical direction as represented in Figures 74 and 75, both of which represent plan views. These two binoculars may be mounted in a known fixed position relatively to one another, as represented in Figures 76 and 77 where 59 is the fixed structure provided with rigid members 60 for the support of the hinged axis of the horizontal eyepiece binocular arrangement, Figure 76, and the vertical eyepiece binocular arrangement, Figure 77. The horizontal fields 61 and 62 in Figure 78 are seen by one observer and the vertical fields 63 and 64 by the other observer. These fields may be made to overlap as indicated in Figure 78. In Figure 79 the one observer sees the fields 61 and 62 separated by a space into which is fitted the field 64 seen by the second observer with above it the field 63, or as in Figure 80, the field 64 may be made to overlap the intersection of the fields 61 and 62.

I claim:

1. A binocular observation telescope including a first optical system for one eye of the observer and a second optical system for the other eye of the observer, the objective axes of said systems being directed, by inclination from parallelism thereof, to two differing contiguous object fields of view, each of said systems including an objective lens portion, with said portions arranged with their axes out of parallelism but disposed so that the conical zones of light rays, passing to and from the lens portion of the first optical system, each has one side parallel to a side of the conical zones of light rays passing to and from the lens portion of the second optical system, and said systems each including an eye piece portion, with the axis of each portion out of parallelism but so arranged that the conical zone of light rays passing thru the eye piece of the eye piece portion of said first optical system has one side parallel to a side of the conical zone of light rays passing thru the eye piece of the eye piece portion of said second optical system, said eye piece portions being so related to one another and to the objective portions as to present to the observer two images, one for each eye, combined in contiguous relationship.

2. A binocular observation telescope of Galilean type, including two optical systems, one for each eye of the observer, and having the said systems so arranged that each presents to the corresponding eye of the observer the image of an object field which differs wholly from, but is contiguous to, the object field whose image is presented by the other optical system to the other eye, and each system comprising an objective portion and an eye piece portion, with the objective portions of the two optical systems arranged with their axes out of parallelism, but located so that the conical zones of light rays passing to and from the objective of the first optical system each has one side parallel to a side of the conical zones of light rays passing to and from the objective of the second optical system, and said eye piece portions of the two optical systems arranged with their axes out of parallelism but so that the conical zone of light rays passing thru the eye piece of the eye piece portion of said first optical system has one side parallel to a side of the conical zone of light rays passing thru the eye piece of the eye piece portion of said second optical system, whereby the observer is given a resultant combined contiguous field of view correspondingly greater than that presented by either optical system singly.

3. A double-field binocular telescope including two optical systems, one for each eye of the observer, each comprising an objective portion and an eye piece portion, with the objective portions of the two optical systems arranged with their axes deviating from parallelism, whereby the objective portions are directed to two differing contiguous object fields of view, said systems being arranged so that the conical zones of light rays passing to and from the objective portion of one optical system have one side parallel to the like rays of the other system and have one side oblique to the like rays of the other system, said eye piece portions being so related to one another and the objective portions as to present to the observer two images, one for each eye, combined in contiguous relationship.

4. A binocular observation instrument including a first optical system for one eye of the observer and a second optical system for the other eye of the observer, each of said first and second optical systems comprising an objective portion and an eye piece portion with the objective portions of the two optical systems arranged with their axes out of parallelism, but located so that the conical zones of light rays passing to and from the objective of the first optical system each has one side parallel to a side of the conical zones of light rays passing to and from the objective of the second optical system, so that the objective portions are directed to two different contiguous object fields of view, and said eye piece portions of the two optical systems arranged with their axes out of parallelism, but so that the conical zone of light rays passing thru the eye piece of the eye piece portion of said first optical system has one side parallel to a side of the conical zone of light rays passing thru the eye piece of the eye piece portion of said second optical system, to present to the eyes of the observer the two different image fields corresponding to the object fields.

JAMES WEIR FRENCH.